United States Patent
Spitz et al.

(10) Patent No.: US 9,338,647 B2
(45) Date of Patent: May 10, 2016

(54) MOBILE STATION WITH BOND BETWEEN END DEVICE AND SECURITY ELEMENT

(71) Applicant: GIESECKE & DEVRIENT GMBH, Munich (DE)

(72) Inventors: Stephan Spitz, Karlsfeld (DE); Markus Kohler, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/407,284

(22) PCT Filed: Jun. 3, 2013

(86) PCT No.: PCT/EP2013/001619
§ 371 (c)(1),
(2) Date: Dec. 11, 2014

(87) PCT Pub. No.: WO2013/185888
PCT Pub. Date: Dec. 19, 2013

(65) Prior Publication Data
US 2015/0126153 A1    May 7, 2015

(30) Foreign Application Priority Data
Jun. 13, 2012    (DE) .................. 10 2012 011 728

(51) Int. Cl.
*H04M 1/66* (2006.01)
*H04M 1/68* (2006.01)
*H04M 3/16* (2006.01)
*H04W 12/04* (2009.01)
*H04M 1/675* (2006.01)
*H04W 12/08* (2009.01)
*H04W 4/00* (2009.01)
*H04W 12/06* (2009.01)
*H04W 88/02* (2009.01)

(52) U.S. Cl.
CPC .............. *H04W 12/04* (2013.01); *H04M 1/675* (2013.01); *H04W 4/001* (2013.01); *H04W 12/06* (2013.01); *H04W 12/08* (2013.01); *H04W 88/02* (2013.01)

(58) Field of Classification Search
CPC ..... H04W 12/04; H04W 4/001; H04W 12/06; H04W 12/08; H04W 88/02; H04M 1/675
USPC ........................................................ 455/411
See application file for complete search history.

(56) References Cited

U.S. PATENT DOCUMENTS

| 2001/0030235 A1 | 10/2001 | Hedemann et al. |
| 2008/0003980 A1 | 1/2008 | Voss et al. |
| 2010/0180130 A1* | 7/2010 | Stahl ............... G06F 21/10 713/193 |
| 2010/0275027 A1 | 10/2010 | Belrose et al. |

FOREIGN PATENT DOCUMENTS

| DE | 10019164 A1 | 10/2001 |
| EP | 1271992 A2 | 1/2003 |
| WO | 2007042226 A1 | 4/2007 |

OTHER PUBLICATIONS

German Search Report for corresponding German Application No. 10 2012 011 728.0, Feb. 7, 2013.
Global Platform, "Global Platform Device Technology: TEE System Architecture," Public Review Draft Oct. 2011, Version 0.4, Document Reference: GPD_SPE_009, URL: http://www.wavxdd.com/docs/GPDC_TEE_SYS_Arch_v0.4.pdf.
International Search Report for corresponding International PCT Application No. PCT/EP2013/001619, Aug. 27, 2013.

* cited by examiner

*Primary Examiner* — Tanmay Shah
(74) *Attorney, Agent, or Firm* — Workman Nydegger

(57) ABSTRACT

The invention relates to a mobile station comprising a terminal (ME) and a security element ((U)(SIM)) which can be operated, removed or securely implemented in the terminal (ME), a link being provided between the terminal (ME) and the security element ((U)(SIM)) and being verifiable by means of a secret key (PrK; KST) and by means of the verification key (Puk; KSA). The terminal (ME) comprises a secured runtime environment (TEE), and the verification key (PuK; KST) is stored in the secured runtime environment (TEE).

13 Claims, 2 Drawing Sheets

MOBILE STATION WITH BOND BETWEEN END DEVICE AND SECURITY ELEMENT

BACKGROUND

The invention relates to a mobile station, consisting of an end device and a security element operable in the end device, with a bond between the end device and removable security element (SIM lock).

A mobile end device is understood to mean a device for using a mobile telecommunications system in conjunction with a security element, for example a mobile telephone, smart phone or PDA (personal digital assistant) with mobile telephone function. The security element is designed in many mobile telecommunications systems as a removable subscriber card (microprocessor chip card). The core piece of the subscriber card is the security module, which contains identity data, such as the international mobile subscribers' identity IMSI. Examples of mobile telecommunications systems include GSM (global system for mobile communications), UMTS (universal mobile telecommunications system), and IMT-2000 (international mobile communication 2000). In the GSM mobile telecommunications system, the security module is referred to as a SIM (SIM=subscriber identity module), and in the UMTS mobile telecommunications system it is referred to as a USIM (USIM=universal SIM). In these cases, the subscriber card is often referred to as a SIM card or USIM card respectively. Fixedly implemented (for example fixedly soldered) security elements are also proposed as security elements, for example eUICCs (embedded UICCs), which are structurally separate from the end device chip, but in this case are fixedly implemented and cannot be removed from the end device without being destroyed.

Mobile end devices are often offered at subsidised process by providers, for example operators of mobile telecommunications networks. In return, the buyer is to use the end device with any costs incurred to the favour of the network operator. So as to ensure use to the favour of the network operator, the operation of the end device is restricted by a Sim lock method. As a result of the SIM lock, the end device for example can only be used with an individual predetermined subscriber card, in a predetermined mobile telecommunications network, and/or in a predetermined country, etc.

DE 100 19 164 A1 describes a SIM lock method, in which the end device compares parts of the IMSI (for example mobile country code MCC, mobile network code MNC, home location register HLR) from the SIM card with target values and, in accordance with the comparison, grants or blocks the use of the end device with the SIM card in the mobile telecommunications network.

The SIM lock is conventionally removed by inputting into the end device a release code stored secretly by the network operator, such that the end device and the SIM card are no longer bound to one another for operation in a mobile telecommunications network. This unblocking system based on release codes is susceptible to manipulation. For example, spied release codes are publicly available to anybody and allow the unauthorised unblocking of SIM locks.

EP 1 271 992 B1 describes a method for checking the SIM lock between a SIM card and an end device by means of a secured program, wherein the program is verified with a verification key stored in the end device. For example, a signature is calculated with a private key via data used for the checking process, and the signature is verified in the end device with the corresponding public key as a verification key. Alternatively, the data are encrypted with a symmetric key and, for verification, are decrypted in the end device with the key. The SIM lock method described in EP 1 271 992 B1 is protected by cryptographic algorithms implemented in the chip of the end device. The verification result could be influenced by attacks on the algorithms and this protection could therefore also be nullified.

The expression "trustzone architecture" is known to be a two-part runtime architecture for a microprocessor system, which comprises two runtime environments. A first "normal zone" or "normal world" unsecure runtime environment is controlled by a normal operating system (for example Android, Windows Phone, Symbian). A second secured or trustworthy runtime environment called a "trustzone" or "trusted world" or "secure world" or "trusted execution environment TEE" is controlled by a security operating system.

Security-critical applications and some peripheral functions (for example keyboard drivers) are controlled securely by the security operating system. Applications under the security operating system are also referred to as trustlets (registered trademark)—an association of the terms "trust" and "applet".

An operational processor can generally be divided into three levels as follows: the hardware level, the operating system level and the application level. The security operating system of a secured runtime environment is to be assigned to the operating system level. The drivers for different peripheral functions are to be assigned to the hardware level. The radio interface layer driver (RIL driver) is provided as a special driver at hardware level in the chip of a mobile end device and allows the chip of the end device to communicate at hardware level with peripheral components, in particular with a SIM card, USIM card, UICC, eUICC or the like operated in the end device. Applications in a SIM card, USIM card, UICC, eUICC, etc. are generally referred to as applets. Trustlets are applications in the chip of the mobile end device.

The document "Global Platform Device Technology: TEE System Architecture, Version 0.4, Public Review Draft October 2011, Document Reference: GPD_SPE_009" describes a mobile end device having a normal unsecure execution environment "rich execution environment (REE)" and a secure execution environment "trusted execution environment (TEE)" (see Chapter 1).

SIM lock may comprise a bond between an individual end device and an individual removable security element. Alternatively, a bond to a specific network operator or group of network operators or to a geographical area (for example country) is established by SIM lock by means of a security element and end device, whereby or in which the end device is operable with the security element. Special SIM locks, which comprise a bond to network operators or to a geographical area, may also be expedient for fixedly implemented (for example fixedly soldered) security elements, such as eUICCs or the like.

The object of the invention is to disclose a mobile station, comprising an end device and a removable or fixedly implemented security element operable in the end device, with a secured bond (SIM lock) between the end device and security element. A method for securely verifying the bond is also disclosed.

SUMMARY

The mobile station according to Claim 1 comprises an end device and a removable or fixedly implemented security element operable in the end device, for example a SIM card, USIM card or UICC. A bond is established between the end device and security element, such that the end device and the security element are only operable together in accordance with the bond. A secret key is stored in the security element. A verification key corresponding to the secret key is stored in the end device. The bond between the end device and the security element can thus be verified by means of the secret key and the verification key. For example, the private key of an asymmetric encryption system is provided as a secret key, and the public key corresponding to the private key is provided as a verification key. Alternatively, the secret key and the verification key are the same symmetric key kept secret.

The mobile station is characterised in that the end device comprises a secured runtime environment (trusted execution environment TEE) and the verification key is stored in the secured runtime environment. Since the verification key with which the bond (SIM lock) can be verified is provided in the secured runtime environment of the end device, an end-to-end secured connection channel is established between the end device and the security element, via which data can be exchanged, secured end-to-end. The verification process is thus secured against manipulation.

A mobile station with a secured bond between the end device and security element is thus created in accordance with Claim 1.

A bond application operable exclusively under control of the secured runtime environment is optionally implemented in the secured runtime environment and is designed to verify the bond between the end device and the security element. In this case, the verification key is stored such that it can be called exclusively by the bond application. The bond is thus verified in the secured runtime environment at application level and can thus be handled conveniently by a programmer for example. For example, a trustlet with SIM lock content is provided as a bond application.

A bond applet, that is to say a SIM lock applet, is optionally implemented in the security element and is designed to verify the bond between the end device and the security element, wherein the secret key is stored such that it can be called exclusively by the bond applet. The verification of the bond at application level is thus implemented in the security element and can thus be handled conveniently by a programmer for example.

During verification of the bond, the bond applet in the security element optionally woks together with the abovementioned bond application (for example trustlet) in the secured execution environment. The bond is thus verified continuously at application level. The verification of the bond can thus take place within a single level, namely the application level. Changes to the used level (application, operating system or hardware), which would necessitate translations when programming a verification routine and are thus error sources, do not exist.

At least part of an RIL driver is also optionally implemented in the secured runtime environment and is set up for communication at hardware level between a security operating system in the secured runtime environment and the security element. In this case, the bond application is set up to communicate with the at least part of the RIL driver within the secured runtime environment. Due to the bond application, the RIL driver is controlled in accordance with the verification of the bond. Verification thus takes place at application level, whereas the mobile station is operated in accordance with the verification directly at hardware level and is therefore particularly secure.

The end device optionally also has a normal execution environment, wherein the verification key is inaccessible from the normal execution environment. The end device therefore has a two-part runtime environment, and the bond between the end device and security element (SIM lock) is implemented in the secure region of the TEE and is decoupled from the unsecure region of the normal runtime environment.

In a method for verifying the bond between the end device and the security element in a mobile station, a verification request (challenge) is sent by the end device to the security element. A verification response is sent by the security element to the end device, said response containing verification information (SIG) generated by means of the secret key. The verification response is checked by the end device by means of the verification key. The bond between the end device and the security element is verified as existent or non-existent depending on the result of the check.

Since the verification key with which the bond is verified is provided in the secured runtime environment of the end device, an end-to-end secured connection channel is established between the end device and the security element, via which data can be exchanged, secured end-to-end. The verification process is thus secured against manipulation.

The underlying basic method is known per se in this instance. For example, a challenge-response method known per se is used. In this case, a random number is generated or otherwise provided and is sent as a challenge to the security element. The security element verifies the challenge with the verification key. For example, the end device encrypts the random number with a secret key of an asymmetric key pair and sends the cipher to the security element. The security element decrypts the cipher with the corresponding public key of the key pair. Alternatively, the end device encrypts with the public key as a secret key and the security element decrypts with the private key as a verification key. This is only possible for the security element that the correct public or private key and that is thus bound to the end device. Alternatively, the end device and security element use the same symmetric key. The end device encrypts the random number and the security element decrypts it with the symmetric key In a method for setting-up (commissioning, initial launch) of a mobile station, the bond of the mobile station is verified by a method as described above. If the bond between the end device and the security element is verified as existent, the setting-up of the mobile station is granted. If the bond between the end device and the security element is verified as non-existent, the setting-up of the mobile station is prevented or terminated. The prevention or termination of the setting-up process may be designed for example as a termination of the boot process of an operating system, or alternatively as an initiation of the booting of an alternative operating system, which for example only allows emergency calls.

At least part of an RIL driver is also optionally implemented in the secured runtime environment (see above). In this case, if the bond between the end device and the security element is verified as existent, the setting-up of the mobile station is granted at hardware level by the at least part of the RIL driver. If, by contrast, the bond between the end device and the security element is verified as non-existent, the setting-up of the mobile station is prevented or terminated at hardware level by the at least part of the RIL driver.

If the end device also has a normal execution environment (normal zone) and the verification key is inaccessible from the normal execution environment, the secured runtime environment is optionally started up first when setting-up the mobile station, and the normal execution environment is then started up, such that the bond is verified before setting-up of the normal execution environment (normal zone). If SIM lock violation is identified (for example because the incorrect security element is inserted in the end device), it is thus ensured that the unsecured normal execution environment is not started up. By contrast, the secure execution environment already started up is secured against manipulations such as attacks by harmful software (trojans, etc.) or abusive reprogramming. The mobile station is thus safeguarded particularly effectively by the implementation of the SIM lock in the secure runtime environment started first. For example, a normal operating system (Rich OS) for operating the normal runtime environment is not started in the event of an absent bond between the end device and the security element (identification of SIM lock violation). Alternatively, merely an emergency operating system, which only allows emergency calls, is started in the event of verification of an absent bond between the end device and security element.

BRIEF DESCRIPTION OF THE DRAWINGS

The invention will be explained in greater detail hereinafter on the basis of exemplary embodiments and with reference to the drawing, in which.

DETAILED DESCRIPTION OF VARIOUS EMBODIMENTS

Figure 1:
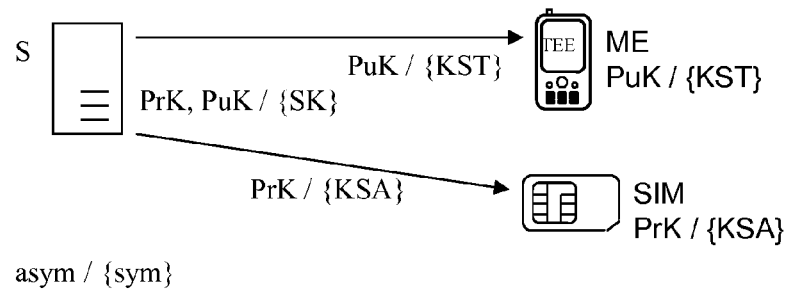
FIG. 1 shows a mobile station according to embodiments of the invention in communication with a background server when establishing a bond between an end device and security element.

FIG. 1 shows a mobile station according to embodiments of the invention in communication with a background server S. The mobile station comprises an end device ME (mobile entity) and, as a security element, a SIM card. A secured runtime environment TEE (trusted execution environment) is implemented in the end device ME and is operated by a security operating system TEE OS. The establishment of a bond between the end device ME and SIM card is shown in FIG. 1. In accordance with a first embodiment, an asymmetric key pair PuK, PrK is used for the bond. In accordance with a second alternative embodiment marked in curly brackets, a symmetric metric key KS is used for the bond. In accordance with the first embodiment, an asymmetric key pair comprising a public key PuK and a private key PrK is generated in the background server S. The private key PrK is stored in the SIM card as a secret key. The public key PuK is stored in the secured runtime environment TEE of the end device ME as a verification key. In accordance with the second alternative embodiment marked in curly brackets, an individual symmetric key KS is generated instead of the asymmetric key pair and is stored as a secret key KSA (applet key) in the SIM card and is also stored as a verification key KST (trustlet key) in the secured runtime environment TEE of the end device ME.

Figure 2:
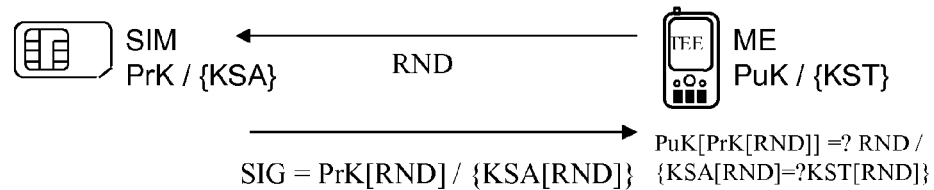
FIG. 2 shows the mobile station from FIG. 1 when verifying the established bond between an end device and security element.

FIG. 2 shows the mobile station from FIG. 1 during verification of the established bond between the end device ME and SIM card. The end device ME sends a verification request (challenge) comprising a random number RND to the SIM card. The SIM card encrypts the random number RND with the secret key PrK to form a cipher Sig and sends the cipher Sig to the end device ME. The end device ME decrypts the received cipher with the public key PuK. Only if the decryption result matches the sent random number RND does the SIM card have the correct key, and the bond is verified as existent. Otherwise, it is verified that the SIM card and end device ME are not bound to one another, that is to say a SIM lock error is detected. In the second embodiment, the SIM card encrypts the random number RND received by the end device ME with the symmetric key KSA and sends the cipher thus generated to the end device ME. The end device ME encrypts the random number with its own symmetric key KST and compares the cipher thus generated to the cipher obtained from the SIM card. If the ciphers match, there is a bond between the SIM card and the end device ME; otherwise, there is no bond.

Figure 3:
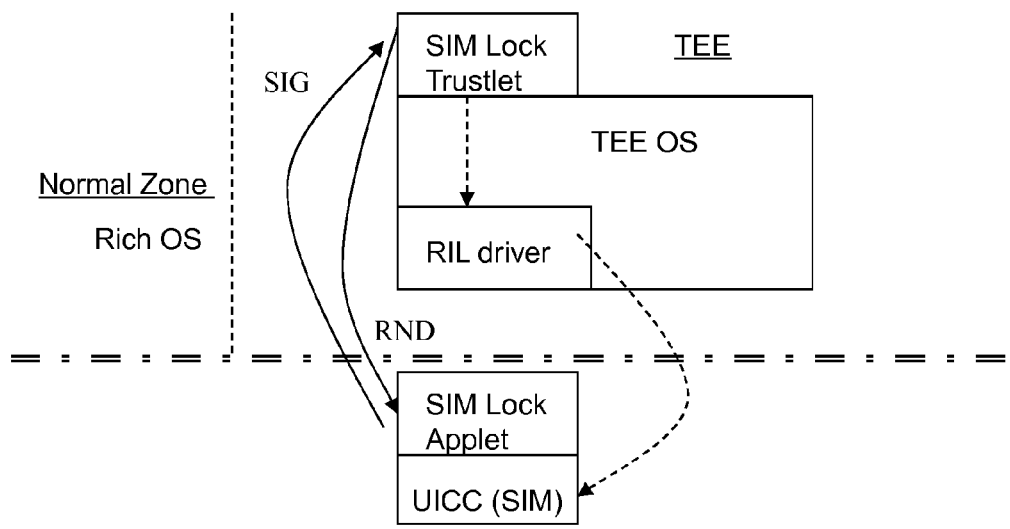
FIG. 3 shows a two-part runtime architecture in a mobile end device according to one embodiment of the invention.

FIG. 3, above the dashed double line, shows a two-part runtime architecture in a mobile end device ME in accordance with one embodiment of the invention. A SIM card/UICC operated in the end device ME is illustrated below the dashed double line. The runtime architecture comprises a secured runtime environment TEE operated by a security operating system TEE OS and a normal runtime environment (normal zone) operated by a normal operating system Rich OS. A SIM lock trustlet is implemented in the secured runtime environment TEE under the security operating system TEE OS and controls an RIL driver likewise operational under the TEE OS. The SIM lock trustlet is set up to verify the bond between the end device ME and the SIM card at application level. A SIM lock applet corresponding to the SIM lock trustlet is implemented in the SIM card. The bond between the end device ME and SIM card can be verified at application level with cooperation between the SIM lock trustlet and SIM lock applet, for example by the method illustrated in FIG. 2. The operation of the end device with the SIM card can be prevented at hardware level in the event of failed SIM lock verification (that is to say no bond between the end device and SIM card).

Figure 4:
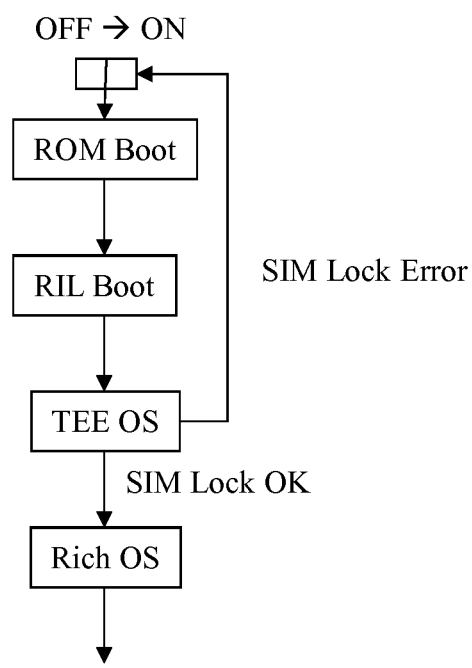
FIG. 4 shows a boot process in a mobile station according to one embodiment of the invention.

FIG. 4 schematically illustrates, in chronological sequence, the basic processes during a boot process in a mobile station comprising an end device ME and a SIM card or UICC operated in the end device ME, in accordance with one embodiment of the invention. The end device ME is switched on, as indicated by the symbol "OFF-ON". The non-volatile memory ROM is booted (ROM Boot). Peripheral components, for example the radio interface layer RIL, are booted (RIL Boot). The security operating system TEE OS is started and the secure runtime environment TEE is started up. The bond between the end device ME and the SIM card is verified within the TEE OS, for example as illustrated in FIGS. 2 and 3. If the verification reveals that the end device ME and SIM card are paired (SIM lock OK), the normal operating system Rich OS is started from the secured runtime environment TEE, under the control of the security operating system TEE OS. If the verification reveals that the end device ME and SIM card are not paired (SIM lock error), the normal operating system Rich OS is started from the secured runtime environment TEE under the control of the security operating system TEE OS.

The invention claimed is:

1. A mobile station comprising an end device (ME) and comprising a removable or fixedly implemented security element ((U)SIM) operable in the end device (ME), a bond being established between the end device (ME) and the security element ((U)SIM), such that the end device (ME) and the security element ((U)SIM) are only operable together in accordance with the bond, a secret key (PrK; KST) being stored in the security element ((U)SIM) and a verification key (PuK; KSA) corresponding to the secret key being stored in the end device (ME), such that the bond between the end device (ME) and the security element ((U)SIM) can be verified by means of the secret key (PrK; KST) and the verification key (PuK; KSA;

wherein the end device (ME) comprises a secured runtime environment (TEE) and the verification key (PuK; KST) is stored in the secured runtime environment (TEE).

2. The mobile station according to claim 1, wherein a bond application (SIM lock trustlet) operable exclusively under control of the secured runtime environment (TEE) is implemented in the secured runtime environment (TEE) and is implemented to verify the bond between the end device (ME) and the security element ((U)SIM), wherein the verification key (PuK; KST) is stored such that it can be called exclusively by the bond application (SIM lock trustlet).

3. The mobile station according to claim 1, wherein a bond applet (SIM lock applet) is implemented in the security element (SIM) and is implemented to verify the bond between the end device (ME) and the security element ((U)SIM), wherein the secret key (PrK; KSA) is stored such that it can be called exclusively by the bond applet (SIM Lock Applet).

4. The mobile station according to claim 1, wherein further a security operating system is implemented in the secured runtime environment (TEE), and wherein at least part of an RIL driver is implemented in the secured runtime environment (TEE) and is set up for communication at hardware level between said security operating system and the security element (SIM), and wherein the bond application (SIM lock trustlet) is set up to communicate with the at least part of the RIL driver within the secured runtime environment (TEE).

5. The mobile station according to claim 1, wherein the end device (ME) further has a normal execution environment (normal zone), wherein the verification key (PuK; KST) is inaccessible from the normal execution environment (normal zone).

6. A method, in a mobile station according to claim 1, comprising the steps of:
   verifying the bond between the end device (ME) and the security element ((U)SIM); wherein a verification request (challenge; RND) is sent by the end device (ME) to the security element (SIM);
   wherein a verification response is sent by the security element (SIM) to the end device (ME), said verification response containing verification information (SIG) generated by means of the secret key (PrK; KSA); and
   wherein the verification response is checked by the end device (ME) by means of the verification key (PuK; KST) and the bond between the end device (ME) and the security element ((U)SIM) is verified as existent or non-existent depending on the result of the check.

7. A method for setting-up of a mobile station, wherein a bond of the mobile station is verified by a method according to claim 6;
   wherein if the bond between the end device (ME) and the security element (SIM) is verified as existent, the setting-up of the mobile station is granted; and
   wherein if the bond between the end device (ME) and the security element (SIM) is verified as non-existent, the setting-up of the mobile station is prevented or terminated or is only granted to a limited extent.

8. The method according to claim 7, wherein the mobile station is further designed wherein a bond application (SIM lock trustlet) operable exclusively under control of the secured runtime environment (TEE) is implemented in the secured runtime environment (TEE) and is implemented to verify the bond between the end device (ME) and the security element ((U)SIM), wherein the verification key (PuK; KST) is stored such that it can be called exclusively by the bond application (SIM lock trustlet).

9. The method according to claim 7, wherein the mobile station is further designed, wherein a bond applet (SIM lock applet) is implemented in the security element (SIM) and is implemented to verify the bond between the end device (ME) and the security element ((U)SIM), wherein the secret key (PrK; KSA) is stored such that it can be called exclusively by the bond applet (SIM Lock Applet).

10. The method according to claim 7, wherein the mobile station is further designed wherein further a security operating system is implemented in the secured runtime environment (TEE), and wherein at least part of an RIL driver is implemented in the secured runtime environment (TEE) and is set up for communication at hardware level between said security operating system and the security element (SIM), and wherein the bond application (SIM lock trustlet) is set up to communicate with the at least part of the RIL driver within the secured runtime environment (TEE).

11. The method according to claim 7, wherein the mobile station is further designed, wherein the end device (ME) further has a normal execution environment (normal zone), wherein the verification key (PuK; KST) is inaccessible from the normal execution environment (normal zone).

12. The method according to claim 7, wherein the mobile station wherein further a security operating system is implemented in the secured runtime environment (TEE), and wherein at least part of an RIL driver is implemented in the secured runtime environment (TEE) and is set up for communication at hardware level between said security operating system and the security element (SIM), and wherein the bond application (SIM lock trustlet) is set up to communicate with the at least part of the RIL driver within the secured runtime environment (TEE); and
   wherein if the bond between the end device (ME) and the security element (SIM) is verified as existent, the setting-up of the mobile station is granted at hardware level by the at least part of the RIL driver, and,
   if the bond between the end device (ME) and the security element (SIM) is verified as non-existent, the setting-up of the mobile station is prevented or terminated at hardware level by the at least part of the RIL driver.

13. The method according to claim 9, wherein the end device (ME) further has a normal execution environment (normal zone), wherein the verification key (PuK; KST) is inaccessible from the normal execution environment (normal zone), and wherein the secured runtime environment (TEE) is started up first when setting-up the mobile station, and the normal execution environment (normal zone) is started up afterwards, such that the bond is verified before setting-up of the normal execution environment (normal zone).

* * * * *